United States Patent
Nakazima et al.

(10) Patent No.: US 9,519,332 B2
(45) Date of Patent: Dec. 13, 2016

(54) INFORMATION PROCESSING APPARATUS, INFORMATION PROCESSING SYSTEM, AND POWER CONTROL METHOD

(71) Applicant: SONY CORPORATION, Tokyo (JP)

(72) Inventors: Shinzi Nakazima, Nagano (JP); Juniti Hoashi, Nagano (JP)

(73) Assignee: Sony Corporation, Tokyo (JP)

(*) Notice: Subject to any disclaimer, the term of this patent is extended or adjusted under 35 U.S.C. 154(b) by 197 days.

(21) Appl. No.: 14/463,996

(22) Filed: Aug. 20, 2014

(65) Prior Publication Data

US 2015/0067365 A1    Mar. 5, 2015

(30) Foreign Application Priority Data

Aug. 27, 2013    (JP) .............................. 2013-175222

(51) Int. Cl.
- G06F 1/26 (2006.01)
- G06F 1/32 (2006.01)
- H04W 52/02 (2009.01)
- G06F 3/0488 (2013.01)

(52) U.S. Cl.
CPC ........... G06F 1/3265 (2013.01); G06F 1/3231 (2013.01); G06F 1/3262 (2013.01); G06F 1/3287 (2013.01); H04W 52/0254 (2013.01); H04W 52/0267 (2013.01); G06F 1/26 (2013.01); G06F 1/32 (2013.01); G06F 1/3203 (2013.01); G06F 3/0488 (2013.01); Y02B 60/1242 (2013.01); Y02B 60/1282 (2013.01); Y02B 60/1289 (2013.01)

(58) Field of Classification Search
CPC .... G06F 1/3203; G06F 3/0488; G06F 1/3265; G06F 3/0416; G06F 1/26; G06F 1/32
USPC .......................... 713/300, 320, 322, 323, 324
See application file for complete search history.

(56) References Cited

U.S. PATENT DOCUMENTS

| | | | |
|---|---|---|---|
| 2006/0200684 A1* | 9/2006 | Bibikar | G06F 1/3203 713/300 |
| 2008/0188267 A1* | 8/2008 | Sagong | G06F 1/1626 455/566 |
| 2009/0166098 A1 | 7/2009 | Sunder | |
| 2009/0197615 A1 | 8/2009 | Kim et al. | |
| 2011/0154065 A1 | 6/2011 | Rothman et al. | |

FOREIGN PATENT DOCUMENTS

EP    2395736 A1    12/2011

OTHER PUBLICATIONS

Oct. 7, 2015, EP communication issued for related EP application No. 14181252.9.

* cited by examiner

*Primary Examiner* — Michael J Brown
(74) *Attorney, Agent, or Firm* — Paratus Law Group, PLLC

(57) ABSTRACT

There is provided an information processing apparatus including a mode control unit configured to perform control at least so as to switch a first mode that causes the information processing apparatus to be operated at a first voltage level and a second mode that causes the information processing apparatus to be operated at a second voltage level higher than the first voltage level, and an operation control unit configured to disable certain input operation performed by a user if a state satisfies a certain condition after the mode control unit switches a mode to the second mode.

14 Claims, 11 Drawing Sheets

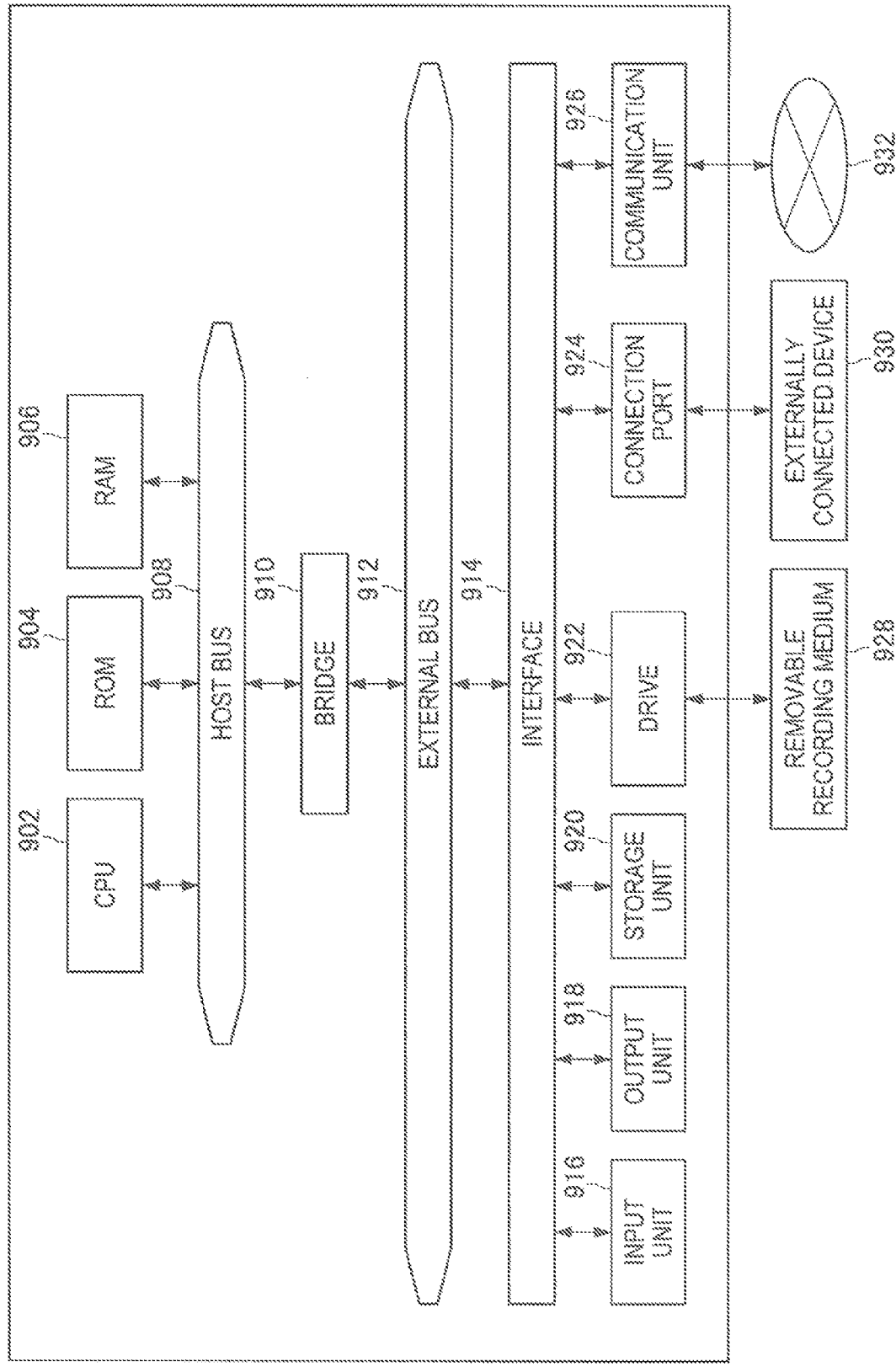

INFORMATION PROCESSING APPARATUS, INFORMATION PROCESSING SYSTEM, AND POWER CONTROL METHOD

CROSS REFERENCE TO RELATED APPLICATIONS

This application claims the benefit of Japanese Priority Patent Application JP 2013-175222 filed Aug. 27, 2013, the entire contents of which are incorporated herein by reference.

BACKGROUND

The present disclosure relates to an information processing apparatus, an information processing system, and a power control method.

A central processing unit (CPU) incorporated into a personal computer (PC) operates in low power by lowering an operating frequency and an operating voltage at a time of instruction execution. On the other hand, at a time of no instruction execution, the CPU operates so as to reduce power consumption by transiting to a sleep state operating at a very low operating voltage. For example, JP 2004-246400A discloses a mechanism for transiting to a sleep state when a CPU is in a no instruction execution state.

Such as a cell phone, a smartphone, and a tablet terminal, equipment that can constantly connect to a network and that can instantly turn on and off a power supply has been widely spread. In addition, a movement to cause PCs to achieve operation (AOAC, always on always connect) achieved by such equipment is spreading. As a technology for achieving an AOAC environment, there is a technology referred to as Connected Standby or Intel® Smart Connect Technology (iSCT), for example.

Particularly, iSCT have a feature that can easily achieve a relatively-inexpensive AOAC environment by using an existing device. iSCT is a technology that equipment periodically returns from a sleep state (S3) to a state (S0-iSCT) running with low power consumption, runs only for a short time, receives an e-mail, updates data, and then again returns to the sleep state. By such operation, a user can consistently use an up-to-date PC.

SUMMARY

Even if it is a short time, an e-mail is received and data is updated in the S0-iSCT state. Accordingly, for a system of a PC such as an operating system (OS) or BIOS, there is no difference from a running state (S0). In a case of a PC whose screen is not exposed, such as a laptop, because the user closes a lid when the PC is not used, it is possible to physically prevent the screen which is provided with a touchscreen from being touched even in the S0-iSCT state.

However, recently, a tablet type PC with an OS and systems that are the same as existing PCs have been distributed. Since the tablet type PC is consistently in a state where the screen is exposed, such tablet type PC shifts into a running state when the screen is touched in the S0-iSCT state. Accordingly, when the AOAC environment is tried to be achieved in such tablet type PC, an object touches the screen in a bag for example, the tablet type PC unexpectedly shifts into a running state, and heating and unnecessary consumption of battery may occur in association with the running.

Accordingly, the present disclosure proposes a novel and improved information processing apparatus, information processing system, and power control method that can prevent a shift into a running state that a user does not intend when the AOAC environment is achieved.

According to an embodiment of the present disclosure, there is provided an information processing apparatus including a mode control unit configured to perform control at least so as to switch a first mode that causes the information processing apparatus to be operated at a first voltage level and a second mode that causes the information processing apparatus to be operated at a second voltage level higher than the first voltage level, and an operation control unit configured to disable certain input operation performed by a user if a state satisfies a certain condition after the mode control unit switches a mode to the second mode.

According to an embodiment of the present disclosure, there is provided an information processing system including a display unit configured to display information, a mode control unit configured to perform control at least so as to switch a first mode that causes an information processing apparatus to be operated at a first voltage level and a second mode that is a state where the display unit does not display information and that causes the information processing apparatus to be operated at a second voltage level higher than the first voltage level, and an operation control unit configured to, if a state satisfies a certain condition after the mode control unit switches a mode to the second mode, disable certain input operation performed by a user, the certain input operation switching the state to a state where the display unit displays information.

According to an embodiment of the present disclosure, there is provided a power control method including performing control at least so as to switch a first mode that causes an information processing apparatus to be operated at a first voltage level and a second mode that causes the information processing apparatus to be operated at a second voltage level higher than the first voltage level, and disabling certain input operation performed by a user if a state satisfies a certain condition after a mode is switched to the second mode.

As described above, the present disclosure proposes a novel and improved information processing apparatus, information processing system, and power control method that can prevent a shift into a running state that a user does not intend when the AOAC environment is achieved. Note that the present disclosure is not limited to the effect stated above and in addition to or in place of the effect stated above, may achieve any of the effects indicated in this specification or effects that can be understood from the specification.

BRIEF DESCRIPTION OF THE DRAWINGS

FIG. 12 is an explanatory diagram showing a hardware configuration example.

DETAILED DESCRIPTION OF THE EMBODIMENT(S)

Figure 1:
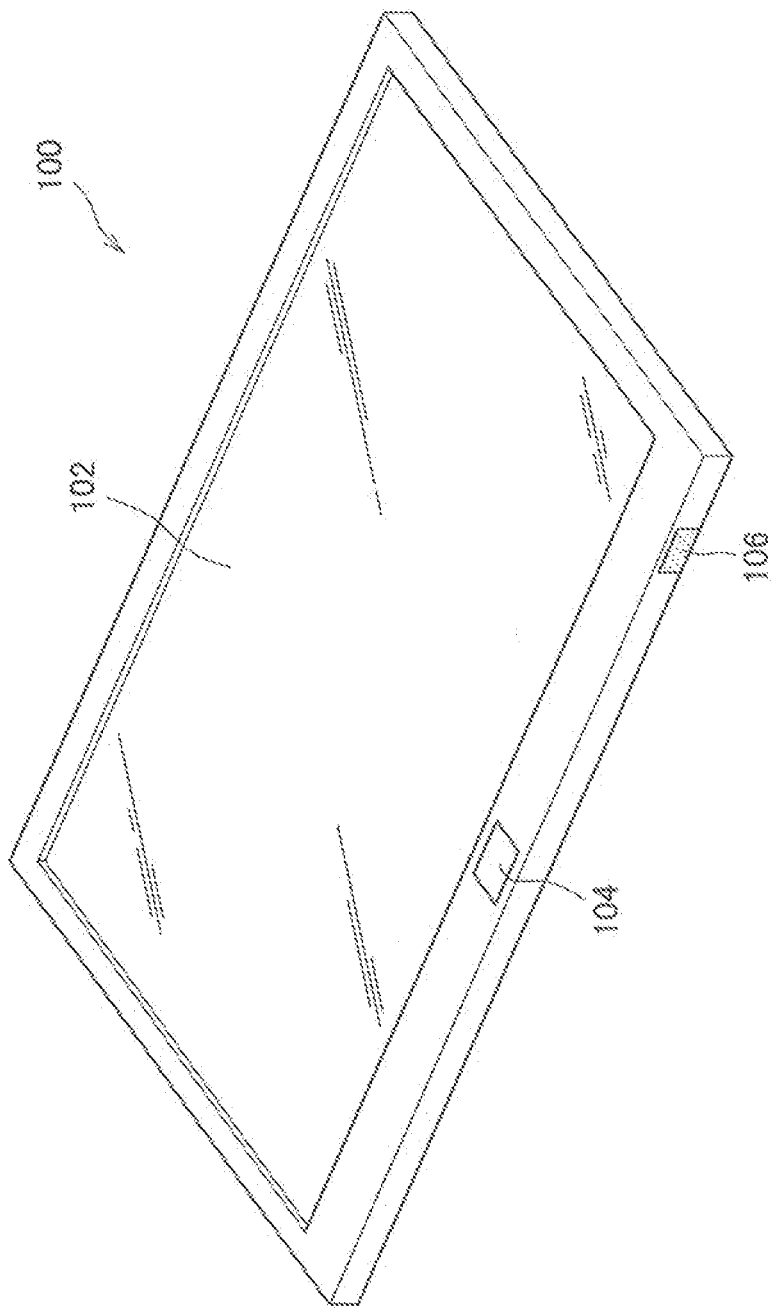
FIG. 1 is an explanatory diagram showing an appearance example of a PC 100 according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. First Embodiment (Example in Case of iSCT)
1.1. Appearance Example of PC
1.2. Configuration Example of PC
1.3. Operation Example of PC
1.4. Modification
2. Second Embodiment (Example in Case of Performing Control Screen State)
2.1 Configuration Example of PC
3. Another Embodiment
4. Hardware Configuration
5. Conclusion

1. FIRST EMBODIMENT

Example in Case of iSCT

[1.1. Appearance Example of PC]

First, an appearance example of a PC according to a first embodiment of the present disclosure is shown. FIG. 1 is an explanatory diagram showing an appearance example of a PC 100 according to the first embodiment of the present disclosure. With reference to FIG. 1, the appearance example of the PC 100 according to the first embodiment of the present disclosure will be explained.

The PC 100 according to the first embodiment of the present disclosure achieves an always-on always-connected (AOAC) environment in which the PC 100 can constantly connect to a network and can instantly turn on and off a power supply. The PC 100 according to the first embodiment of the present disclosure achieves the always-on always-connected (AOAC) environment by using iSCT. The following description will be given on a premise that the PC 100 achieving the AOAC environment using iSCT has a state (S0-iSCT) running with low power consumption in addition to a sleeping mode set by Advanced Configuration and Power Interface (ACPI).

As shown in FIG. 1, the PC 10 according to the first embodiment of the present disclosure is a so-called tablet type apparatus including a touchscreen in a display. FIG. 1 shows the PC 100 including a display unit 102, a main button 104, and a power button 106.

The display unit 102 includes a display for displaying a letter, an image, a movie, and other information. For example, the display unit 102 may include a liquid crystal display, or an organic EL display. In addition, the display unit 102 includes a touchscreen having a touchpad on a display screen. The PC 100 receives input operation performed by a user by causing the user to touch the display unit 102 with a finger, a stylus, or the like.

The main button 104 is a button for turning on the display unit 102, or for causing a certain menu screen to be displayed on the display unit 102. For example, when the user presses the main button 104 in a state where the display unit 102 is off, the PC 100 shifts into a running state (S0), causes the display unit 102 to turn on, and displays a lock screen or a menu screen on the display unit 102. The lock screen is a screen for preventing the PC 100 from operating improperly by an unintended touch to the touchscreen. The menu screen is a screen for causing the user to execute an application.

The power button 106 is a button for turning on and off the PC 100. When the user keeps pressing (so called long press) the power button 106 for a certain time period, the PC 100 performs processing such as turning on the power so as to shift into a running state (S0), or turning off the power.

For example, when the user presses the power button 106 in a state where the display unit 106 is off, the PC 100 causes the display unit 102 to turn on, and displays the lock screen or the menu screen on the display unit 102. As an another example, when the user presses the power button 106 in a state where the display unit 102 is on and displays a screen, the PC 100 causes the display unit 102 to turn off. A function of the main button 104 and a function of the power button 106 differ in that the PC 100 does not cause the display unit 102 to turn off even if the user presses the main button 104 in the state where the display unit 102 is on and displaying a screen.

Peripheral equipment such as a keyboard, a touchpad, and a mouse may be connected to the PC 100 while the peripheral equipment is not shown in FIG. 1. For example, such peripheral equipment is connected to the PC 100 through a Universal Serial Bus (USB).

In the case where the user puts the PC 100 into the sleep state (S3), iSCT periodically (for example, every 15 minutes during a day, and every 2 hours during a night) causes the PC 100 to return to a state (S0-iSCT) running with low power consumption, to run only for a short time, and to receive an e-mail and update data in a state where the display unit 102 is off without the user knowing about such operation. Note that, the S3 state is an example of a first mode according the embodiment of the present disclosure, and the S0-iSCT state is an example of a second mode according the embodiment of the present disclosure.

To put the PC 100 into the sleep state (S3), for example, the user keeps the PC 100 unused for a while, or the user presses the power button 106 so as to turn off the display unit 102. Next, after receiving the e-mail or updating the data, the PC 100 shifts into the sleep state (S3) again. As described above, even if the PC 100 is in the sleep state (S3), the PC 100 can get new information by periodically shifting from the sleep state (S3) to the S0-iSCT state.

In a state where a sleep mode is S3, the PC 100 can maintain the S3 state even if the user unintendedly performs input operation on an input device such as the touchscreen. However, in a state where a sleep mode is S0-iSCT, for a system of a PC such as an OS or BIOS, there is no difference from a running state (S0). When a touchscreen is touched in the state where the sleep mode is S0-iSCT, a screen turns on in response to the touch and the tablet type PC such as the PC 100 shifts into the running state (S0). Accordingly, when the AOAC environment is tried to be achieved in such tablet type PC by using iSCT, the tablet type PC may unexpectedly shift from S0-iSCT to a running state (S3) in a bag for example, and heating and unnecessary consumption of battery may occur in association with the running.

Even in the S0-iSCT state, the PC 100 does not turn on the display unit 102 only by touching the main button 104 or the power button 106. However, it is highly possible that the display unit 102 constituting a large part of a surface area of the PC 100 is touched without the user knowing about the touch. Accordingly, a shift into the running state (S0) by touching the display unit 102 that the user does not intend has to be avoided.

A similar phenomenon may occur not only by touching the touchscreen, but also by touching the peripheral equipment which may be connected in a wireless or wired manner, such as a keyboard and a touchpad. That is, when the peripheral equipment which may be connected in a wireless or wired manner, such as the keyboard or the touchpad, is touched in the state where the sleep mode is S0-iSCT, the screen turns on in response to the touch and the state of the PC 100 shifts into the running state (S0).

In a traditional PC, the keyboard and the touchpad are often controlled by systems such as the Basic Input/Output System (BIOS), an embedded controller (EC), and a keyboard controller (KBC). In this case, the systems stop giving a notification to an OSs of equipment such as the keyboard and touchpad in the S0-iSCT state, and accordingly control can be performed. However, in a case where the equipment such as the keyboard and the touchpad are connected through the USB, the system side can know the shift into S0-iSCT, but it is difficult for the system side to perform control so as to disable a notification to the OSs of equipment such as the keyboard and touchpad.

Accordingly, when shifting into the S0-iSCT state, the PC 100 according to the embodiment of the present disclosure gives a notification indicating that the state of the PC 100 has shifted into the S0-iSCT state, to a program referred to as a utility program that operates on the OS executed by the PC 100. Subsequently, the utility program, which received a notification indicating that the state of the PC 100 has shifted into the S0-iSCT state, performs control so as to disable input to the input device such as the touchscreen, the keyboard, and the touchpad. According to such operation, the PC 100 according to the embodiment can prevent shifting into the running state (S0) even if input that the user does not intend is performed on the touchscreen, the keyboard, the touchpad, and the like in the S0-iSCT state.

With reference to FIG. 1, the appearance example of the PC 100 according to the first embodiment of the present disclosure has been explained. Next, a configuration example of the PC 100 according to the first embodiment of the present disclosure will be explained.

[1.2. Configuration Example of PC]

Figure 2:
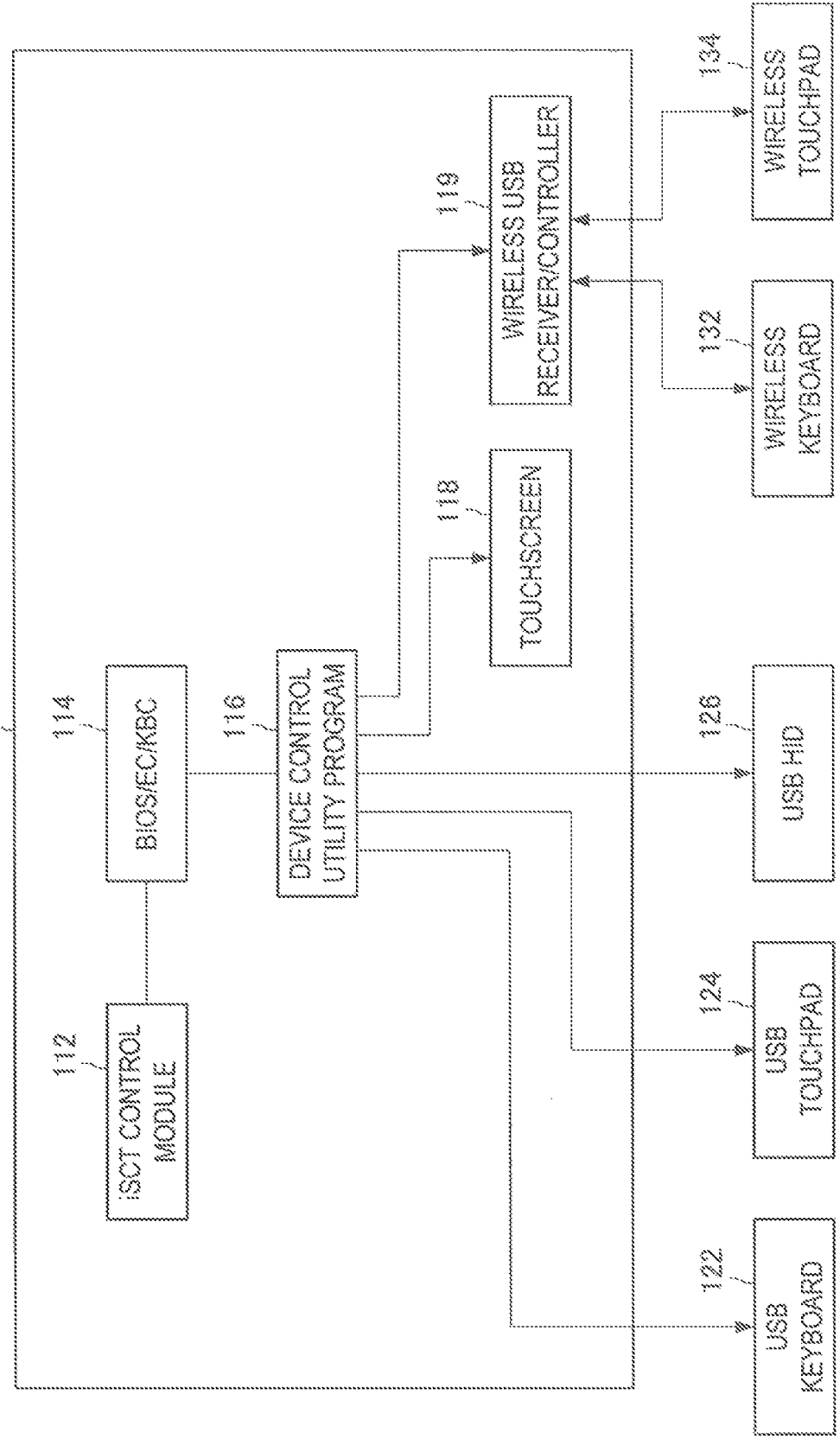
FIG. 2 is an explanatory diagram showing a configuration example of the PC 100 according to the first embodiment of the present disclosure.

FIG. 2 is an explanatory diagram showing a configuration example of the PC 100 according to the first embodiment of the present disclosure. In the following, with reference to FIG. 2, the configuration example of the PC 100 according to the first embodiment of the present disclosure will be explained.

As shown in FIG. 2, the PC 100 according to the first embodiment of the present disclosure includes an iSCT control module 112, BIOS/EC/KBC 114, a device control utility program 116, a touchscreen 118, and a wireless USB receiver/controller 119.

The touchscreen 118 is a device that is provided on the display unit 102 and in which the display screen and the touchpad are integrated. The user of the PC 100 can operate the PC 100 by touching the touchscreen 118 with the finger, the stylus, or the like, or by approximating the finger, the stylus, or the like to the touchscreen 118.

In addition, FIG. 2 further shows that the PC 100 connects with a USB keyboard 112, a USB touchpad 124, and a USB human interface device (HID) 126 other than the keyboard and the touchpad.

The USB keyboard 112, the USB touchpad 124, and the USB HID 126 are each a device connected with the PC 100 through a USB, and are each an input device for causing the user to perform certain input operation to the PC 100.

The iSCT control module 112 is a module for controlling whether the PC 100 shifts from the sleep state (S3) to the S0-iSCT state in the case where the PC 100 is in the sleep state (S3). When the iSCT control module 112 receives, from the BIOS/EC/KBC 114, a notification that the PC 100 is in the sleep state (S3), the iSCT control module 112 periodically (for example, every 15 minutes during a day, and every 2 hours during a night) determines whether a condition for a shift into the S0-iSCT state is satisfied.

For example, a precondition for the shift into the S0-iSCT state is whether the PC 100 has connected to a network such as the Internet or the wireless LAN. In a case where the PC 100 has not connected to the network such as the Internet or the wireless LAN, the PC 100 does not shift into the S0-iSCT state because the PC 100 cannot acquire information through the network. On the other hand, in a case where the PC 100 has satisfied the precondition for the shift into the S0-iSCT state, the iSCT control module 112 notifies the BIOS/EC/KBC 114 to periodically shift into the S0-iSCT state. Note that, the iSCT control module 112 does not give the notification to the BIOS/EC/KBC 114 in a case where the PC 100 has not connected to the network such as the Internet or the wireless LAN and has not satisfied the condition for the shift into S0-iSCT state.

The BIOS/EC/KBC 114 is a system for controlling hardware of the PC 100. The BIOS/EC/KBC 114 changes an inner power-supply state according to states of the sleep mode of the PC 100.

The PC 100 according to the embodiment has the S0-iSCT state as the sleep mode. When receiving the notification to shift into the S0-iSCT state from the iSCT control module 112, the BIOS/EC/KBC 114 periodically shifts into the S0-iSCT state. Subsequently, when the BIOS/EC/KBC 114 shifted into the S0-iSCT state, the BIOS/EC/KBC 114 gives, to the device control utility program 116, a notification that the BIOS/EC/KBC 114 shifted into the S0-iSCT state.

The device control utility program 116 is software operating on an OS executed by the PC 100. According to a setting by the user, the device control utility program 116 switches enabling and disabling of an input device embedded in or connected with the PC 100. Alternatively, the device control utility program 116 switches enabling and disabling of input from the input device embedded in or connected with the PC 100 in a wireless or wired manner, according to a state of the sleep mode of the PC 100 that is switched by the BIOS/EC/KBC 114. Here, in an input device that is a target for the device control utility program 116 to switch enabling and disabling of input, the sleep mode is shifted from S0-iSCT state to the S0 state when the operation input is received.

Specifically, when the BIOS/EC/KBC 114 gives, to the device control utility program 116, a notification that the sleep mode has shifted into the S0-iSCT state, the device control utility program 116 disables input from a touchscreen 118, a USB keyboard 122, a USB touchpad 124, and a USB HID 126 that are managed by the device control utility program 116. For example, the device control utility program 116 disables the input from the touchscreen 118, the USB keyboard 122, the USB touchpad 124, and the USB HID 126 through an application programming interface (API) of the OS operating in the PC 100.

As a method for disabling input from the touchscreen 118, the USB keyboard 122, the USB touchpad 124, and the USB HID 126, the device control utility program 116 may ignore input events performed on such input devices, or may cause the events themselves not to occur by stopping power supply to such input devices.

As described above, when the sleep mode has shifted into the S0-iSCT state, input from the touchscreen 118, the USB keyboard 122, the USB touchpad 124, and the USB HID 126 are disabled. Accordingly, the PC 100 can prevent the sleep mode from shifting into the S0 state when input operation that the user does not intend is performed on the touchscreen 118, the USB keyboard 122, the USB touchpad 124, and the USE HID 126 in the case where the sleep mode is in the S0-iSCT state.

Note that, the PC 100 may include the wireless USB receiver/controller 119 for exchanging signals between various kinds of devices in a wireless manner. For example, as shown in FIG. 2, the wireless USB receiver/controller 119 exchanges signals with a wireless keyboard 132 and a wireless touchpad 134 in a wireless manner. In a case where the PC 100 includes the wireless USB receiver/controller 119 and the sleep mode is S0-iSCT state, the sleep mode shifts into the S0 state if the wireless keyboard 132 and the wireless touchpad 134 are not prevented from being input.

When the device control utility program 116 receives, from the BIOS/EC/KBC 114, a notification that the sleep mode has shifted into the S0-iSCT state in the case where the PC 100 includes the wireless USB receiver/controller 119, the device control utility program 116 disables input from the input device connected with the wireless USE receiver/controller 119. By disabling the input from the input device connected with the wireless USB receiver/controller 119, the PC 100 can prevent a shift into the S0 state in the case of S0-iSCT state due to input operation to the wireless keyboard 132 or the wireless touchpad 134 that the user does not intend.

The device control utility program 116 may decide an input device whose input is to be disabled according to the user setting in the case where the sleep mode is the S0-iSCT state. For example, the device control utility program 116 may decide that only the wireless USB receiver/controller 119 is not to be disabled according to the user setting in the case where the sleep mode is the S0-iSCT state.

Since the PC 100 according to the first embodiment of the present disclosure includes the configuration shown in FIG. 2, the PC 100 can prevent the sleep mode from shifting into the S0 state in response to input operation that the user does not intend in the state where the sleep mode is S0-iSCT state. Accordingly, the PC 100 according to the first embodiment of the present disclosure can prevent an unexpected shift into a running state in a bag, and can prevent heating and unnecessary consumption of battery from occurring in association with the running.

With reference to FIG. 2, the configuration example of the PC 100 according to the first embodiment of the present disclosure has been explained. Next, an operation example of the PC 100 according to the first embodiment of the present disclosure will be explained.

[1.3. Operation Example of PC]

Figure 3:
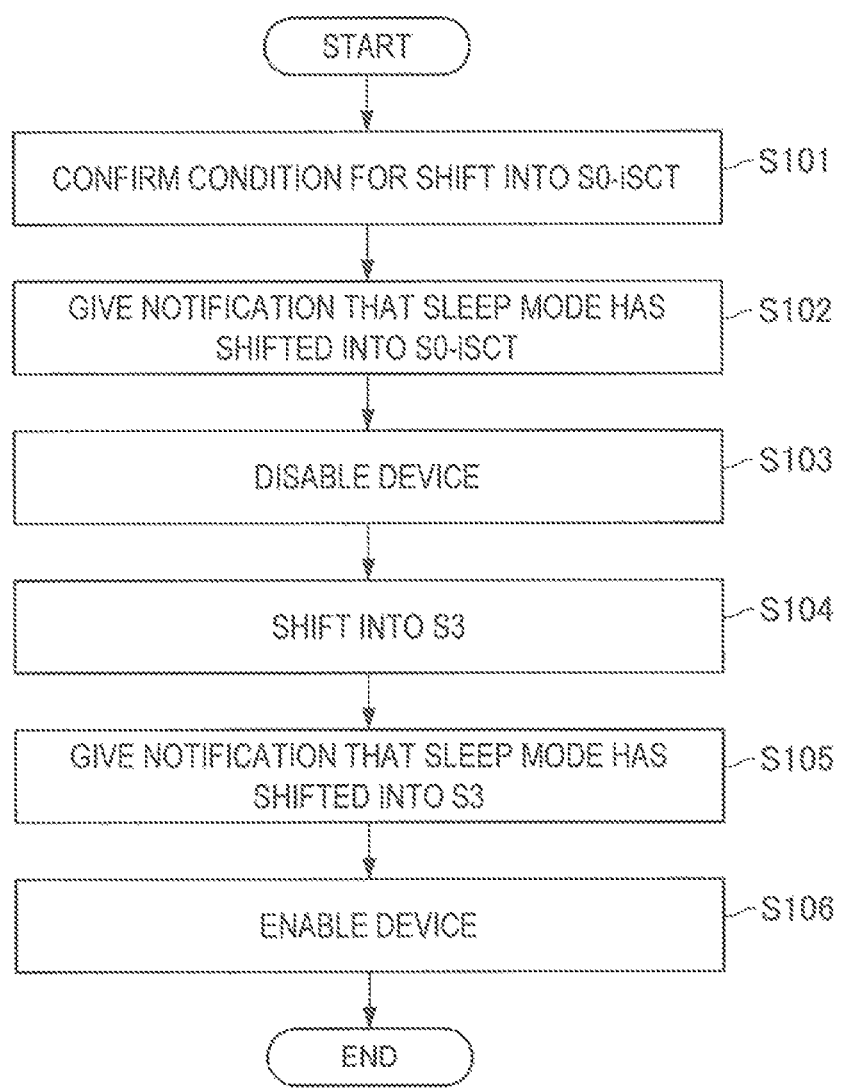
FIG. 3 is a flowchart showing an operation example of the PC 100 according to the first embodiment of the present disclosure.

FIG. 3 is a flowchart showing an operation example of the PC 100 according to the first embodiment of the present disclosure. FIG. 3 shows an operation example of the PC 100 in a case of enabling and disabling the input from the input device according to the sleep mode of the PC 100. In the following, with reference to FIG. 3, the operation example of the PC 100 according to the first embodiment of the present disclosure will be explained.

The flowchart in FIG. 3 shows processing executed on a premise that the sleep mode of the PC 100 is the sleep state (S3). As described above, to put the sleep mode of the PC 100 into the sleep state (S3), for example, the user keeps the PC 100 unused for a while, or the user presses the power button 106 so as to turn off the display unit 102.

When the iSCT control module 112 receives, from the BIOS/EC/KBC 114, a notification that the PC 100 is in the sleep state (S3), the iSCT control module 112 periodically (for example, every 15 minutes during a day, and every 2 hours during a night) confirms whether the condition for a shift into the S0-iSCT state is satisfied (Step S101). Subsequently, if the condition for a shift into the S0-iSCT state is satisfied, the iSCT control module 112 notifies the BIOS/EC/KBC 114 to periodically shift into the S0-iSCT state. When the BIOS/EC/KBC 114 receives, from the iSCT control module 112, the notification to shift into the S0-iSCT state, the BIOS/EC/KBC 114 shifts the sleep mode into the S0-iSCT state.

Next, when the sleep mode has shifted into the S0-iSCT state, the BIOS/EC/KBC 114 gives, to the device control utility program 116, a notification that the sleep mode has shifted into the S0-iSCT state (Step S102). When the device control utility program 116 receives, from the BIOS/EC/KBC 114, a notification that the sleep mode has shifted into the S0-iSCT state, the device control utility program 116 disables a device (in this embodiment, the touchscreen 118, the wireless USB receiver/controller 119, the USB keyboard 122, the USB touchpad 124, or the USB HID 126) that shifts from the S0-iSCT state to the S0 state in response to input operation among devices controlled by the device control utility program 116 (Step S103).

The device control utility program 116 disables input from the device that shifts from the S0-iSCT state to the S0 state in response to input operation among devices controlled by the device control utility program 116. Accordingly, the sleep mode is prevented from shifting from the S0-iSCT state to the S0 state in response to input operation to the device that the user does not intend.

The sleep mode has shifted into the S0-iSCT state, update processing of information such as receiving an e-mail has been executed, the update processing has been completed, and then the PC 100 shifts the sleep mode into the sleep state (S3) again (Step S104). After shifting into the S3 state, the BIOS/EC/KBC 114 notifies the device control utility program 116 of shifting into the S3 state (Step S105).

When the device control utility program 116 receives, from the BIOS/EC/KBC 114, a notification that the sleep mode has shifted into the S3 state, the device control utility program 116 enables the device that has been disabled in Step S103 (Step S106). In a case where the sleep mode is the S3 state, the PC 100 maintains the S3 state even if input operation that the user does not intend is performed on the enabled device.

Since the PC 100 according to the first embodiment of the present disclosure executes the operation shown in FIG. 3, the PC 100 can prevent the sleep mode from shifting into the S0 state in response to input operation that the user does not intend in the case where the sleep mode is S0-iSCT state. Accordingly, the PC 100 according to the first embodiment of the present disclosure can prevent an unexpected shift into a running state in a bag, and can prevent heating and unnecessary consumption of battery from occurring in association with the running.

If the user wants to use the PC 100 in a case where the sleep mode is S0-iSCT state, the user may press the main button 104 or the power button 106, for example. When the user has pressed the main button 104 or the power button 106, the PC 100 shifts the sleep mode from the S0-iSCT state to the S0 state and becomes the running state. That is, in Step S103, input from the main button 104 and the power button 106 are not disabled. This is because, if such buttons are disabled, the user cannot explicitly tell the PC 100 that the user has a will to use the PC 100 in the case where the sleep mode is the S0-iSCT state.

[1.4. Modification]

The above processing is an example of a case where the PC 100 is the tablet type apparatus. However, the example according to embodiments of the present disclosure is not limited thereto. For example, there is a laptop type apparatus having at least two forms: a form in which a lid is closed in a state where the embedded display is not exposed; and a form in which the lid is closed in a state where the embedded display is exposed. Such PC may be referred to as a convertible PC, a transformable PC, or the like. In the following descriptions, the form in which the lid is closed in the state where the embedded display is not exposed may be referred to as a "clamshell mode", and the form in which the lid is closed in a state where the embedded display is exposed may be referred to as a "tablet mode" with regard to such apparatus having at least two forms.

Figure 4:
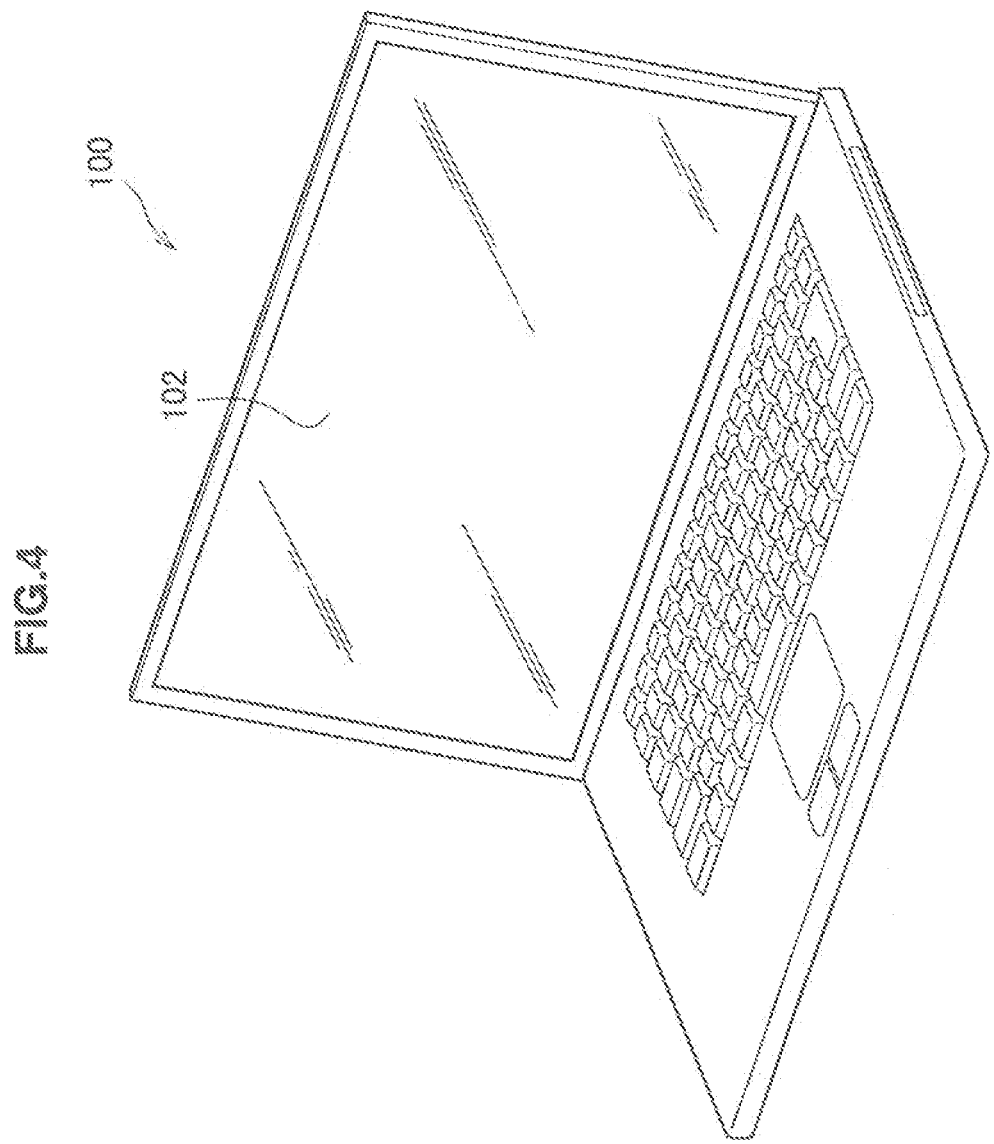
FIG. 4 is an explanatory diagram showing an appearance example of a PC 100 according to the first embodiment of the present disclosure.
Figure 5:
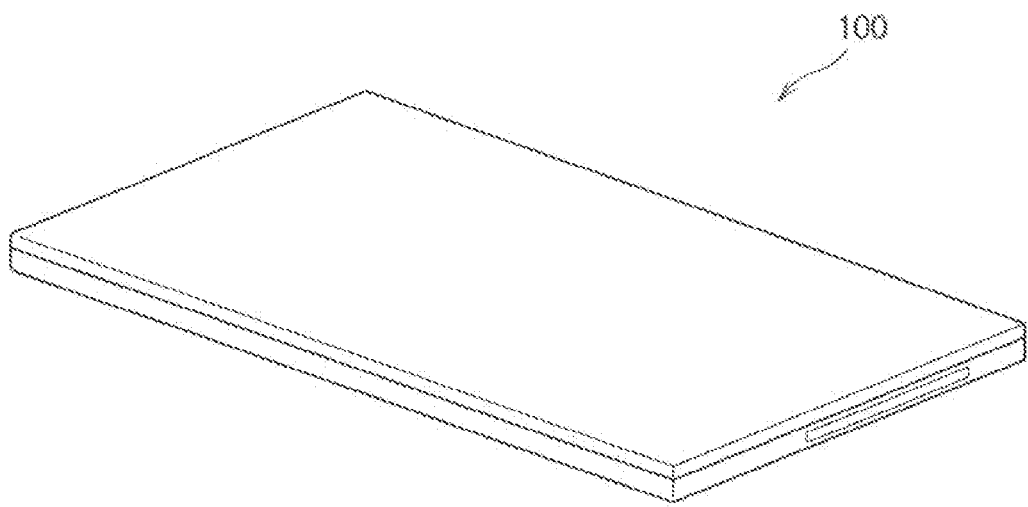
FIG. 5 is an explanatory diagram showing an appearance example of the PC 100 according to the first embodiment of the present disclosure.
Figure 6:
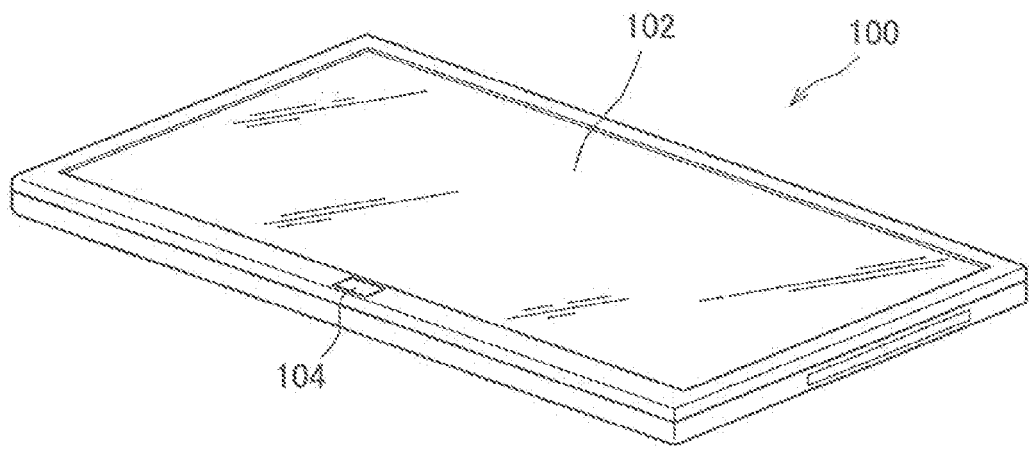
FIG. 6 is an explanatory diagram showing an appearance example of the PC 100 according to the first embodiment of the present disclosure.

FIGS. 4 to 6 are explanatory diagrams showing appearance examples of a PC 100 according to the first embodiment of the present disclosure. FIG. 4 is an appearance example of a state where a lid of the PC 100 is opened, FIG. 5 is an appearance example of a state where the PC 100 is in the clamshell mode, and FIG. 6 is an appearance example of a state where the PC 100 is in the tablet mode.

When the PC 100 adopts such forms, the PC 100 may determine whether input from the device is to be disabled in accordance with how the lid is closed. That is, in the case of the clamshell mode as shown in FIG. 5, touch that the user does not intend is not performed on the touchscreen. However, in the case of the tablet mode as shown in FIG. 6, the touch that the user does not intend may be performed. Accordingly, only in the case of the tablet mode as shown in FIG. 6, the PC 100 disables the input from the device when the sleep mode is the S0-iSCT state.

Figure 7:
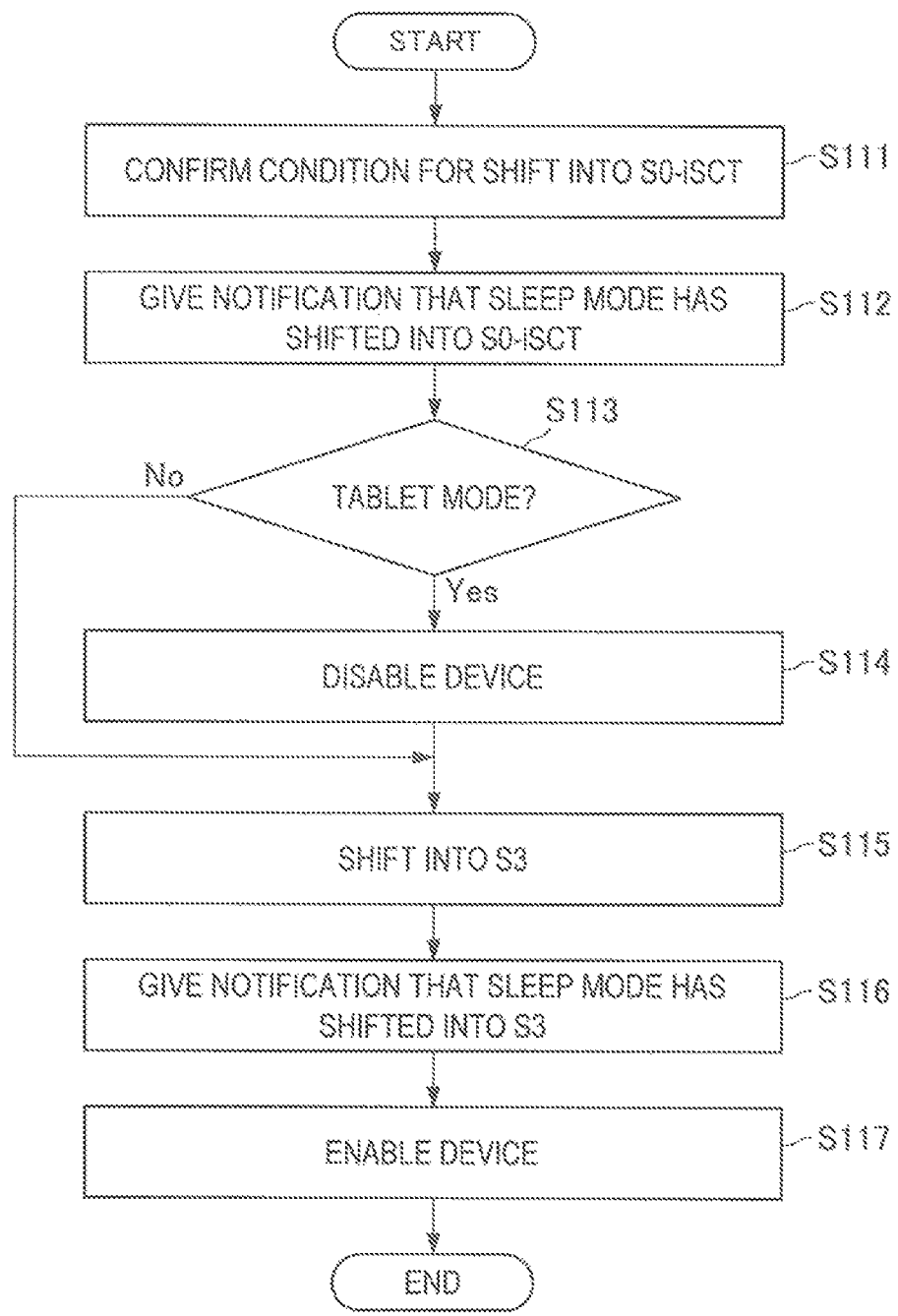
FIG. 7 is a flowchart showing an operation example of the PC 100 according to the first embodiment of the present disclosure.

FIG. 7 is a flowchart showing an operation example of the PC 100 according to a modification of the first embodiment of the present disclosure. FIG. 7 shows an operation example of the PC 100 when input from the device is to be enabled or disabled depending on the sleep mode of the PC 100 or the form of the PC 100. In the following, with reference to FIG. 7, the operation example of the PC 100 according to the modification of the first embodiment of the present disclosure will be explained.

The flowchart in FIG. 7 shows processing executed on a premise that the sleep mode of the PC 100 is the sleep state (S3) in the same way as the flowchart shown in FIG. 3. In addition, the flowchart in FIG. 7 shows processing executed on a premise that the user closed the lid of the PC 100 and the sleep mode of the PC 100 is the sleep state (S3).

In the same way as the processing shown in FIG. 3, the iSCT control module 112 periodically confirms whether the condition for a shift into the S0-iSCT state is satisfied (Step S111). When the BIOS/EC/KBC 114 receives, from the iSCT control module 112, the notification to shift into the S0-iSCT state, the BIOS/EC/KBC 114 shifts the sleep mode into the S0-iSCT state.

Next, when the sleep mode has shifted into the S0-iSCT state, the BIOS/EC/KBC 114 gives, to the device control utility program 116, a notification that the sleep mode has shifted into the S0-iSCT state (Step S112). When the device control utility program 116 receives, from the BIOS/EC/KBC 114, a notification that the sleep mode has shifted into the S0-iSCT state, the device control utility program 116 first determines whether the form of the PC 100 is the tablet mode (Step S113). For example, the BIOS/EC/KBC 114 may know whether the form of the PC 100 is the tablet mode. Accordingly, the device control utility program 116 may acquire information about the form of the PC 100 from the BIOS/EC/KBC 114.

In the case where the form of the PC 100 is the tablet mode (Yes in Step S113), the device control utility program 116 disables a device (in this embodiment, the touchscreen 118, wireless USB receiver/controller 119, the USB keyboard 122, the USB touchpad 124, or the USB HID 126) that shifts from the S0-iSCT state to the S0 state in response to input operation among devices controlled by the device control utility program 116 (Step S114). On the other hand, in a case where the form of the PC 100 is not the tablet mode (No in Step 113), the device control utility program 116 does not disable the device.

The sleep mode has shifted into the S0-iSCT state, update processing of information such as receiving an e-mail has been executed, the update processing has been completed, and then the PC 100 shifts the sleep mode into the sleep state (S3) again (Step S115). After shifting into the S3 state, the BIOS/EC/KBC 114 notifies the device control utility program 116 of shifting into the S3 state (Step S116). When the device control utility program 116 receives, from the BIOS/EC/KBC 114, a notification that the sleep mode has shifted into the S3 state, the device control utility program 116 enables the device that has been disabled in Step S103 (Step S117).

Since the PC 100 according to the modification of the first embodiment of the present disclosure executes the operation shown in FIG. 7, the PC 100 can prevent the sleep mode from shifting into the S0 state in response to input operation that the user does not intend in the case where the sleep mode is S0-iSCT state and the form is the tablet mode. Accordingly, the PC 100 according to the modification of the first embodiment of the present disclosure can prevent an unexpected shift into a running state in a bag, and can prevent heating and unnecessary consumption of battery from occurring in association with the running in the case where the form is the tablet mode.

In the above-described first embodiment of the present disclosure, the device control utility program 116 operating on the OS executed in the PC 100 disables the input from the input device in accordance with the state of the sleep mode. However, embodiments of the present disclosure are not limited thereto. For example, the OS or the device control utility program 116 operating on the OS disables input from the input device by using a command prepared for each input device.

There are PCs which can realize a specification of Connected Standby. Connected Standby is a state where a state of a PC is S0, a processor and a communication module is in operation, and a display is off. In the Connected Standby state, the PC is led by an OS and sets each device in a sleep state referred to as Runtime D3 (RTD3). By setting the devices in the RTD3 state, input operation from each device is disabled in the Connected Standby state.

Accordingly, in the case where the PC 100 can realize Connected Standby, the BIOS/EC/KBC 114 or the device control utility program 116 may set each input device in the above-described RTD3 state when the sleep mode is the S0-iSCT state. After the sleep mode becomes the S0-iSCT state, by setting each input device in the RTD3 state, the PC 100 can prevent the sleep mode from shifting into the S0 state in response to input operation that the user does not intend.

2. SECOND EMBODIMENT

Example in Case of Performing Control in Screen State

Next, a second embodiment of the present disclosure will be explained. In the first embodiment, when the sleep mode had become the S0-iSCT state, by disabling input from the input device, the PC 100 can prevent the sleep mode from shifting into the S0 state in response to input operation that the user does not intend.

On the other hand, as described above, when the display is turned off, a state of the PC 100 becomes the sleep state (S3), and the input device is disabled in the sleep state. Alternatively, in the iSCT, a video standby state that is prepared for normal PCs remains. The Video Standby state is a state where systems are in operation (S0) even if the screen is turned off.

The Video Standby state is a running state (S0) for the systems, and a touchscreen and other input devices are in a valid state. Accordingly the user can turn on the screen by touching the touchscreen in the Video Standby state.

In the above-described first embodiment, when the sleep mode becomes the S0-iSCT state, input from the input device is disabled. Accordingly, the user cannot turn on the screen by touching the touchscreen in the S0-iSCT state. On the other hand, the user can turn on the screen by touching the touchscreen in the Video Standby state (S3 state, but not S0-iSCT state). Accordingly, the states where the screen is off are the same, but the behaviors are different in accordance with inner states when the user touches the touchscreens.

Accordingly, the second embodiment of the present disclosure proposes a configuration or operation that prevents the sleep mode from shifting into the S0 state due to input operation that the user does not intend, or a configuration or operation that prevents the screen from turning on and thereby prevents unnecessary consumption of battery from occurring, by disabling input from an input device in the case where the screen is off.

[2.1 Configuration Example of PC]

Figure 8:
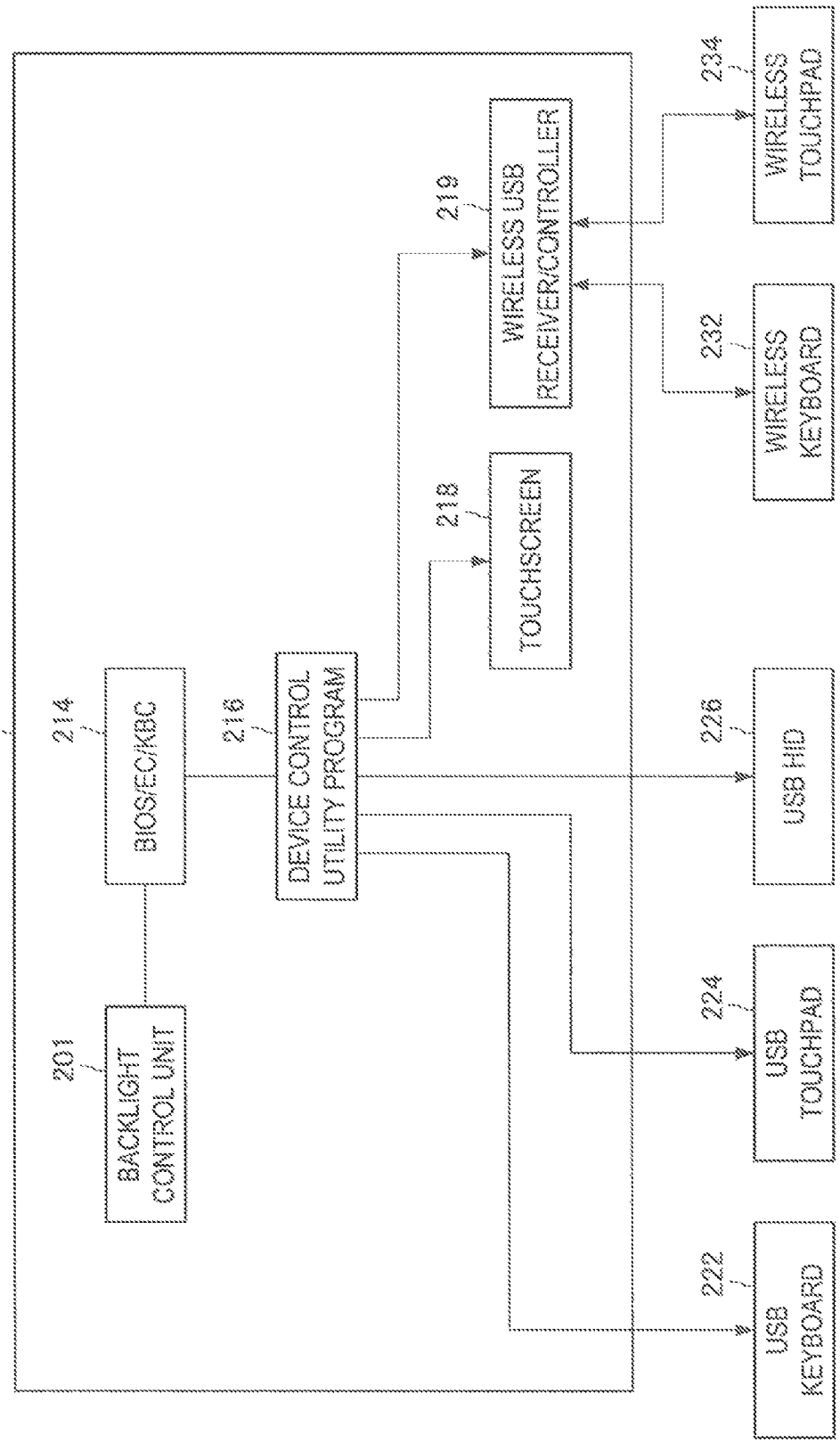
FIG. 8 is an explanatory diagram showing a configuration example of a PC 200 according to a second embodiment of the present disclosure.

FIG. 8 is an explanatory diagram showing a configuration example of a PC 200 according to the second embodiment of the present disclosure. In the following, with reference to FIG. 8, the configuration example of the PC 200 according to the second embodiment of the present disclosure will be explained.

The PC 200 shown in FIG. 8 is a tablet type apparatus similar to the PC 100 according to the first embodiment of the present disclosure, and has an appearance similar to the form shown in FIG. 1. As shown in FIG. 8, the PC 200 according to the second embodiment of the present disclosure includes a backlight control unit 201, BIOS/EC/KBC 214, a device control utility program 216, a touchscreen 218, and a wireless USB receiver/controller 219. In the present embodiment, the touchscreen 218 is a combination of a liquid crystal display screen and a touchpad.

The backlight control unit 201 controls backlight lighting that irradiates from a back face of the touchscreen 218. The backlight control unit 201 transmits a backlight signal to the BIOS/EC/KBC 214 when backlight radiates from the back face of the touchscreen 218. That is, in a case where the screen is displayed, the backlight control unit 201 transmits the backlight signal to the BIOS/EC/KBC 214. In a case where the screen is not displayed, the backlight control unit 201 does not transmit the backlight signal to the BIOS/EC/KBC 214.

The BIOS/EC/KBC 214 is a system for controlling hardware of the PC 200. In this embodiment, the BIOS/EC/KBC 214 gives, to the device control utility program 216, a notification that the backlight has not radiated in a case where the backlight control unit 201 has not transmitted the backlight signal.

The device control utility program 216 is software operating on an OS of the PC 200. According to a setting by the user, the device control utility program 216 switches enabling and disabling of an input device embedded in or connected with the PC 200. Alternatively, the device control utility program 216 switches enabling and disabling of the input device embedded in or connected with the PC 100, according to presence or absence of backlight irradiation to the touchscreen 218. Here, in an input device that is a target for the device control utility program 116 to switch enabling and disabling, the backlight control unit 201 starts irradiating the touchscreen 218 with the backlight when the operation input is received.

Specifically, when the BIOS/EC/KBC 114 gives, to the backlight control utility program 216, a notification that the backlight control unit 201 has stopped irradiating the touchscreen 218 with the backlight, the device control utility program 216 disables a touchscreen 218, a USB keyboard 222, a USB touchpad 224, and a USB HID 226 that are managed by the device control utility program 216. For example, the device control utility program 216 disables the touchscreen 218, the USB keyboard 222, the USB touchpad 224, and the USB HID 226 through an API of the OS operating in the PC 200. By disabling the touchscreen 218, the USB keyboard 222, the USB touchpad 224, and the USB HID 226, the PC 200 can prevent the screen from turning on in response to input operation to such input devices that the user does not intend.

In a way similar to the first embodiment, in the case where the PC 200 includes the wireless USB receiver/controller 219, the device control utility program 216 may disable the wireless USB receiver/controller 219. By disabling the wireless USB receiver/controller 219, the PC 200 can prevent the screen from turning on in response to input operation to the wireless keyboard 232 or the wireless touchpad 234 that the user does not intend.

Since the PC 200 according to the second embodiment of the present disclosure includes the configuration shown in FIG. 8, the PC 200 can prevent the screen from turning on in response to input operation that the user does not intend in the state where the screen is in the off state. Accordingly, the PC 200 according to the second embodiment of the present disclosure can prevent the screen from turning on, and can prevent heating and unnecessary consumption of battery from occurring in association with the screen lighting.

With reference to FIG. 8, the configuration example of the PC 200 according to the second embodiment of the present disclosure has been explained. Next, an operation example of the PC 200 according to the second embodiment of the present disclosure will be explained.

[2.2. Operation Example of PC]

Figure 9:
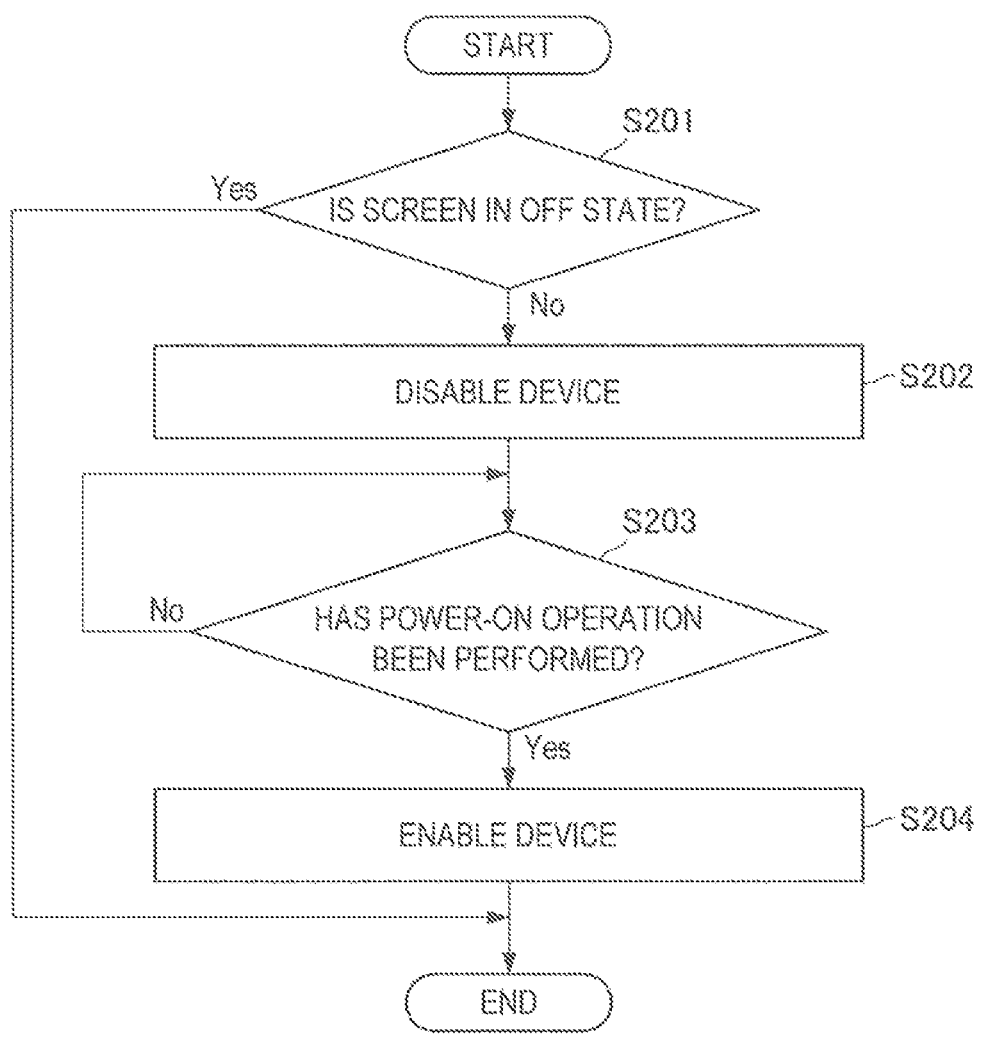
FIG. 9 is a flowchart showing an operation example of the PC 200 according to the second embodiment of the present disclosure.

FIG. 9 is a flowchart showing an operation example of the PC 200 according to the second embodiment of the present disclosure. FIG. 9 shows an operation example of the PC 200 in a case of enabling and disabling the input from the input device according to the lighting state of the screen of the PC 200. In the following, with reference to FIG. 9, the operation example of the PC 200 according to the second embodiment of the present disclosure will be explained.

As described above, the BIOS/EC/KBC 214 gives, to the device control utility program 216, a notification that the backlight has not radiated in a case where the backlight control unit 201 has not transmitted the backlight signal. Accordingly, the device control utility program 216 determines whether or not the screen is in the off state on the basis of whether BIOS/EC/KBC 214 sends a notification that backlight has not radiated (Step S201).

In a case where the screen is in the off state (Yes in Step S201), the device control utility program 216 disables a device (in this embodiment, the touchscreen 218, the wireless USB receiver/controller 119, the USB keyboard 222, the USB touchpad 224, or the USB HID 226) whose screen is turned on in response to input operation among devices controlled by the device control utility program 216 (Step S202).

Subsequently the PC 200 determines whether the user has performed certain power-on operation on the PC 200 (Step S203). For example, the power-on operation of the PC 200 is operation for pressing the main button 104 or a power button 106 shown in the first embodiment.

The PC 200 waits until the user performed the certain power-on operation on the PC 200 (No in Step S203). When the user performed the certain power-on operation on the PC 200 (Yes in Step S203), the BIOS/EC/KBC 214 detects the certain power-on operation and gives, to the device control utility program 216, a notification that the power-on operation was performed. The device control utility program 216 receives the notification, and enables the device that was disabled in the Step S202 (Step S204).

Note that, if the screen is not in the off state (No in Step S201), a series of processing in FIG. 9 are skipped.

Since the PC 200 according to the second embodiment of the present disclosure executes the operation shown in FIG. 9, the PC 200 can prevent the screen from turning on in response to input operation that the user does not intend in the state where the screen is in the off state. Accordingly, the PC 200 according to the second embodiment of the present disclosure can prevent the screen from turning on, and can prevent heating and unnecessary consumption of battery from occurring in association with the screen lighting.

Note that, in the second embodiment, input from the input device is enabled or disabled in accordance with whether the backlight signal is transmitted. However, input from the input device may also be enabled or disabled in accordance with whether the screen is off in a case where the PC 200 includes a self-light-emitting-type display that is not lit by the backlight. In the case where the PC 200 includes the self-light-emitting-type display, the BIOS/EC/KBC 214 can detect whether the display is lighting by sending a certain signal to the BIOS/EC/KBC 214 when the screen turns on.

In the second embodiment, input from the input device is enabled or disabled in accordance with whether the screen is off. However, the PC 200 according to the second embodiment may have the AOAC environment according to the iSCT. That is, the PC 200 according to the second embodiment may periodically become the S0-iSCT state and perform processing for updating information. Needless to say, even if the sleep mode is the S0-iSCT state, the screen is off. Accordingly, the PC 200 according to the second embodiment can disable input from the input device and prevent the screen from turning on.

3. MODIFICATION

In the above embodiments, the device control utility program 116 or 216 executed in the OS disables input from the input device in accordance with a state of the PC 100 or 200. However, the present disclosure is not limited thereto. For example, it is also possible for the BIOS/EC/KBC 114 or 214 to directly control each input device.

Figure 10:
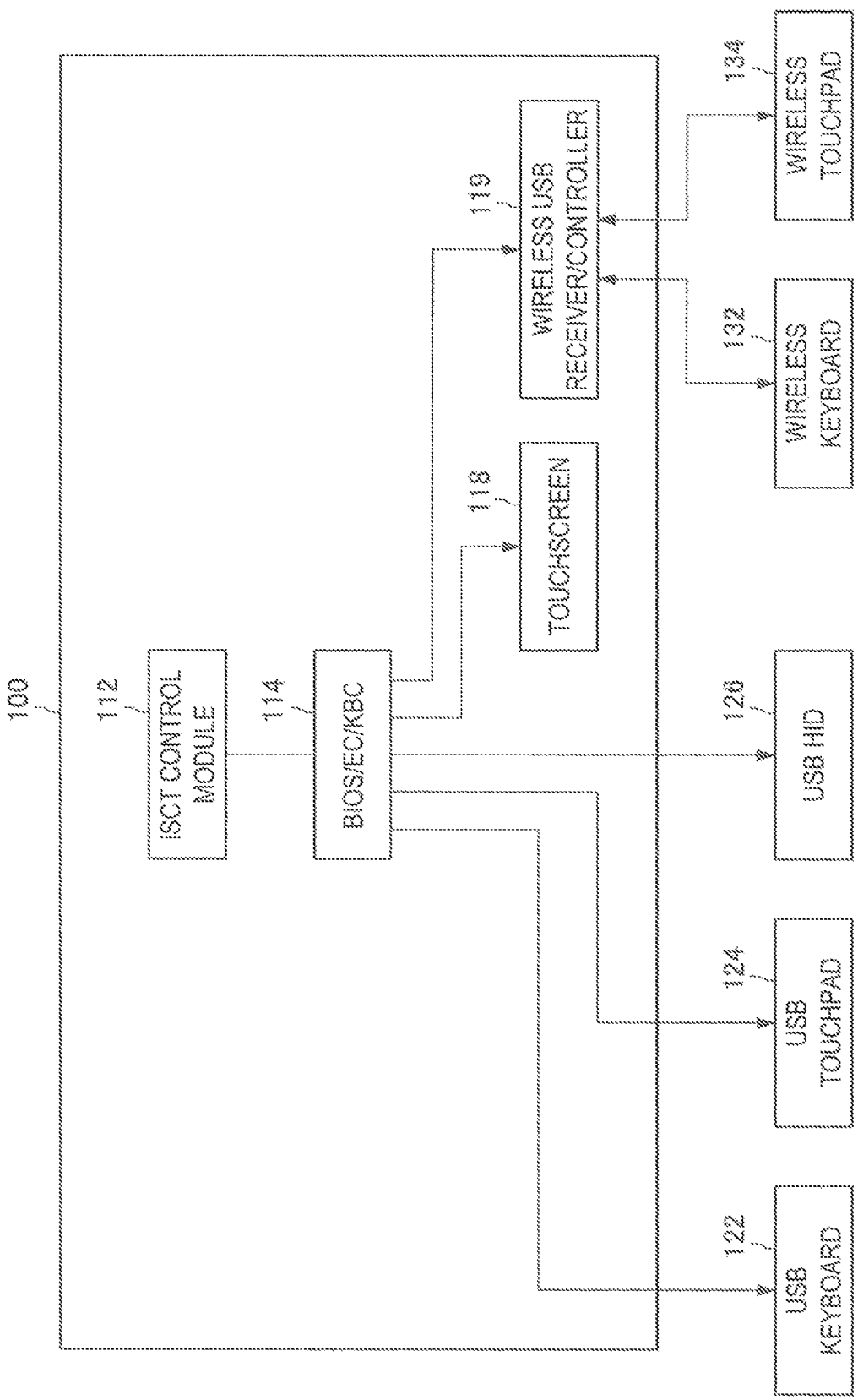
FIG. 10 is an explanatory diagram showing a modification.
Figure 11:
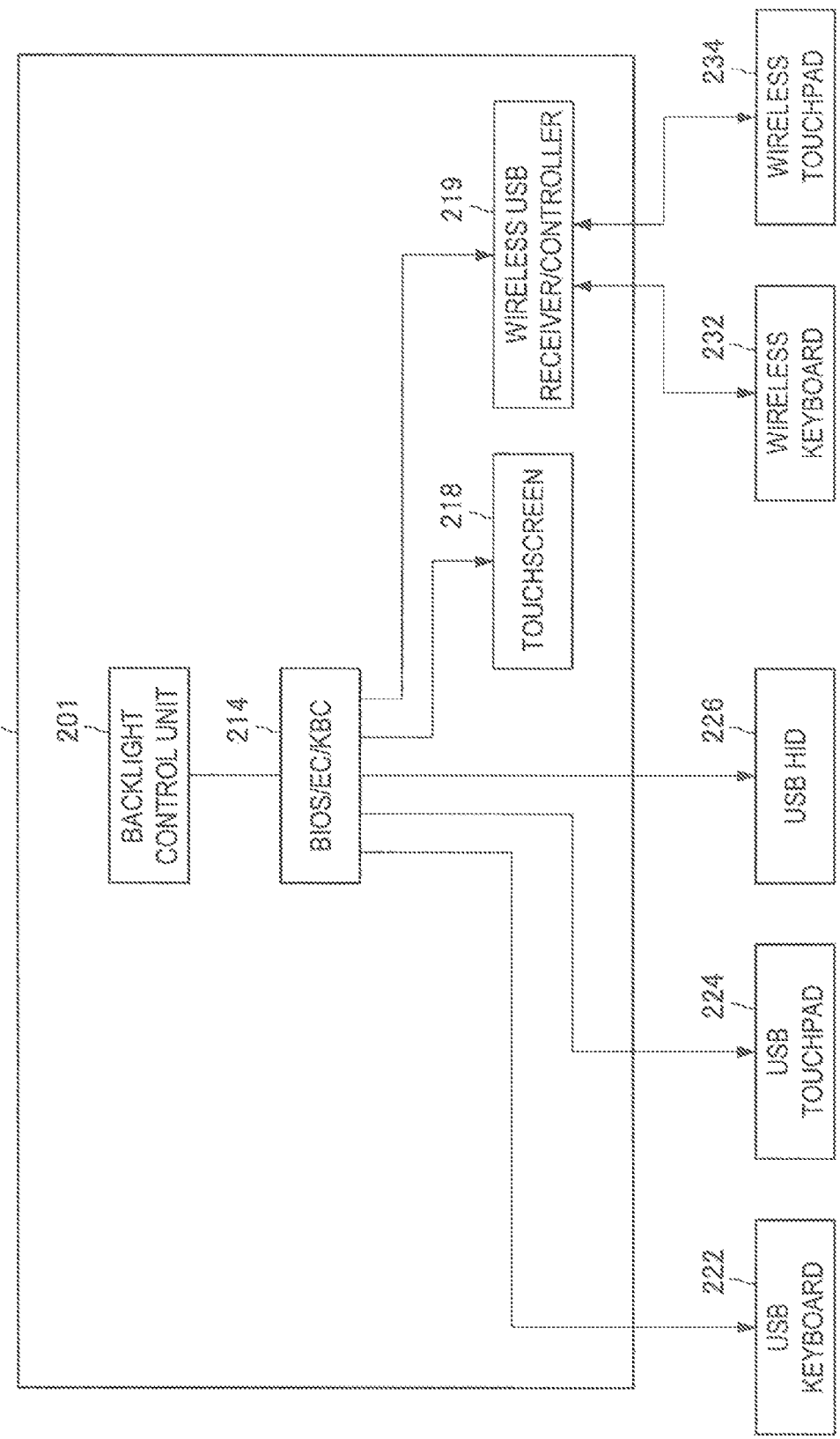
FIG. 11 is an explanatory diagram showing a modification.

FIGS. 10 and 11 are explanatory diagrams showing configuration examples of the PCs 100 and 200 according to modifications of respective embodiments of the present disclosure. FIG. 10 is a modification of the PC 100, and FIG. 11 is a modification of the PC 200.

As shown in FIGS. 10 and 11, it is also possible for the BIOS/EC/KBC 114 or 211 to directly control each input device. In a case where the BIOS/EC/KBC 114 or 214 directly controls each input device, for example, a signal line is set between the BIOS/EC/KBC 114 or 214 and each input device. Subsequently, the BIOS/EC/KBC 114 or 214 may control each input device through each of the input line so as not to generate an input event in a case where the sleep mode is the S0-iSCT state or a case where the backlight is not on.

As shown in FIGS. 10 and 11, the BIOS/EC/KBC 114 or 214 directly controls each input device. Accordingly, it is possible to enable or disable input devices at a system level, and to simplify the configuration.

In addition, as another example of enabling or disabling an input device, the BIOS/EC/KBC 114 or 214 may turn off a power supply of each input device in a case where the sleep mode is the S0-iSCT state or a case where the backlight is not on. Furthermore, as another example, the BIOS/EC/KBC 114 or 214 may disconnect a data control line connected with each input device by using a but switch in a case where the sleep mode is the S0-iSCT state or a case where the backlight is not on.

4. HARDWARE CONFIGURATION

The above described processing may be executed, for example, by using the hardware configuration of an information processing apparatus illustrated in FIG. 12. In other words, the processing may be realized by using a computer program to control the hardware illustrated in FIG. 12. Note that the format of this hardware is arbitrary, and encompasses personal computers, mobile phones, portable information terminals such as PHS devices and PDAs, game consoles, contact or contactless IC chips, contact or contactless IC cards, and various information appliances, for example. Note that PHS above is an abbreviation for Personal Handy-phone System, while PDA above is an abbreviation for personal digital assistant.

As illustrated in FIG. 12, the hardware primarily includes a CPU 902, ROM 904, RAM 906, a host bus 908, and a bridge 910. The hardware additionally includes an external bus 912, an interface 914, an input unit 916, an output unit 918, a storage unit 920, a drive 922, a connection port 921, and a communication unit 926. Note that CPU above is an abbreviation for central processing unit, while ROM above is an abbreviation for read-only memory, and RAM above is an abbreviation for random access memory.

The CPU 902 functions as a computational processing device or control device, for example, and controls all or part of the operation of each structural element on the basis of various programs recorded in the ROM 901, the RAM 906, the storage unit 920, or a removable recording medium 928. The ROM 904 is a way of storing information such as programs loaded by the CPU 902 and data used in computations. The RAM 906 transiently or persistently stores information such as programs loaded by the CPU 902, and various parameters that change as appropriate when executing such programs, for example.

These structural elements are interconnected via a host bus 908 capable of high-speed data transmission, for example. Meanwhile, the host bus 908 is connected via the bridge 910 to an external bus 912 having comparatively low-speed data transmission, for example. Devices such as a mouse, keyboard, touch panel, buttons, switches, and levers may be used as the input unit 916, for example. Additionally, a remote control (hereinafter, remote) capable of using infrared or other electromagnetic waves to transmit control signals may be used as the input unit 916 in some cases.

The output unit 918 includes a device capable of visually or aurally reporting acquired information to a user, and may be a display device such as a CRT, LCD, PDP, or ELD, an audio output device such as one or more speakers or headphones, a printer, a mobile phone, or a fax machine, for example. Note that CRT above is an abbreviation for cathode ray tube, while LCD above is an abbreviation for liquid crystal display, PDP above is an abbreviation for plasma display panel, and ELD above is an abbreviation for electroluminescent display.

The storage unit 920 is a device that stores various data. Devices such as a hard disk drive or other magnetic storage device, a semiconductor storage device, an optical storage device, or a magneto-optical storage device may be used as the storage unit 920, for example. Note that HDD above is an abbreviation for hard disk drive.

The drive 922 is a device that reads out information recorded onto a removable recording medium 928 such as a magnetic disk, an optical disc, a magneto-optical disc, or semiconductor memory, for example, and may also write information to the removable recording medium 928. The removable recording medium 928 is an instance of DVD media, Blu-ray media, HD DVD media, or various semiconductor storage media, for example. Obviously, the removable recording medium 928 may also be an IC card mounted with a contactless IC chip, or other electronic device, for example. Note that IC above is an abbreviation for integrated circuit.

The connection port 924 is a port that connects to an externally connected device 930, such as a USB port, an IEEE 1394 port, a SCSI port, an RS-232C port, or an optical audio terminal, for example. The externally connected device 930 may be a printer, a portable music player, a digital camera, a digital video camera, or an IC recorder, for example. Note that USB above is an abbreviation for Universal Serial Bus, while SCSI above is an abbreviation for Small Computer System Interface.

The communication unit 926 is a communication device that connects to a network 932, and may be a communication card for wired or wireless LAN, Bluetooth (registered trademark), or WUSB, an optical communication router, an ADSL router, or a device for contact or contactless communication, for example. Also, the network 932 connected to the communication unit 926 is a network connected in a wired or wireless manner, and may be the Internet, a home LAN, infrared communication, visible light communication, broadcasting, or satellite communication, for example. Note that LAN above is an abbreviation for local area network, while WUSB above is an abbreviation for Wireless USB, and ADSL above is an abbreviation for asymmetric digital subscriber line.

5. CONCLUSION

As described above, according to the embodiments of the present disclosure, the PCs 100 and 200 having the AOAC environment disables input from the input devices in the case where the sleep mode is the S0-iSCT state or the case where the backlight is not on. In the case where the sleep mode is the S0-iSCT state or the case where the backlight is not on, the PC 100 or 200 disables input from the input device, and prevents the PC 100 or 200 from becoming a running state or prevents the screen from turning on, by performing input operation that the user does not intend.

Accordingly, since the PC 100 or 200 prevents a state from becoming a running state or prevents the screen from turning on, by performing input operation that the user does not intend, battery consumption or heating occurring in association with the running can be prevented without the user noticing such phenomena.

It may not be necessary to chronologically execute respective steps in the processing, which is executed by each apparatus of this specification, in the order described in the sequence diagrams or the flow charts. For example, the respective steps in the processing which is executed by each apparatus may be processed in the order different from the order described in the flow charts, and may also be processed in parallel.

Further, a computer program for causing hardware, such as a CPU, ROM and RAM built into each apparatus to exhibit functions the same as each of the configuration of each apparatus can be created. Further, a storage medium on which this computer program is recorded can also be provided. Moreover, series of processes can also be realized by hardware by configuring the respective function blocks illustrated in the function block diagrams as hardware.

It should be understood by those skilled in the art that various modifications, combinations, sub-combinations and alterations may occur depending on design requirements and other factors insofar as they are within the scope of the appended claims or the equivalents thereof.

In addition, the advantageous effects described in the specification are merely explanatory or illustrative, and are not limited. In other words, the technology according to the present disclosure can exert other advantageous effects that are clear to those skilled in the art from the description of the specification, in addition to or instead of the advantageous effects described above.

Additionally, the present technology may also be configured as below.

(1) An information processing apparatus including:
 a mode control unit configured to perform control at least so as to switch a first mode that causes the information processing apparatus to be operated at a first voltage level and a second mode that causes the information processing apparatus to be operated at a second voltage level higher than the first voltage level; and
 an operation control unit configured to disable certain input operation performed by a user if a state satisfies a certain condition after the mode control unit switches a mode to the second mode.
(2) The information processing apparatus according to (1),
 wherein, in a case where the mode control unit switches the mode from the first mode to the second mode in a certain cycle, the operation control unit disables certain input operation performed by a user on a condition that the information processing apparatus is operating in the second mode, as the certain condition.
(3) The information processing apparatus according to (2),
 wherein the first mode is a mode in a sleeping state.
(4) The information processing apparatus according to any one of (1) to (3),
 wherein the operation control unit disables certain input operation performed by a user on a condition that the information processing apparatus is operating in a state where a display is off, as the certain condition.
(5) The information processing apparatus according to (4),
 wherein, in the case where the information processing apparatus is operating in the state where the display is off, the operation control unit disables the certain input operation if the information processing apparatus is not in a certain state.
(6) The information processing apparatus according to any one of (1) to (5),
 wherein the operation control unit performs control in a manner that input operation not to be disabled exists even if a state of the information processing apparatus satisfies the certain condition.
(7) The information processing apparatus according to (6),
 wherein the input operation not to be disabled is input operation to a power button.
(8) The information processing apparatus according to any one of (1) to (7),
 wherein the mode control unit causes communication processing with external equipment to be executed when causing the information processing apparatus to be operated in the second mode.
(9) The information processing apparatus according to any one of (1) to (8),
 wherein the operation control unit stops power supply to a device on which input operation is performed when certain input operation performed by a user is disabled.
(10) The information processing apparatus according to any one of (1) to (9),
 wherein the operation control unit disables input from a device on which input operation is performed when certain input operation performed by a user is disabled.
(11) The information processing apparatus according to any one of (1) to (10),
 wherein the operation control unit determines an exposure state of a display and then determines whether the certain condition is satisfied.
(12) The information processing apparatus according to (11),
 wherein, in a state where the display is exposed, the operation control unit determines whether the certain condition is satisfied.
(13) An information processing system including:
 a display unit configured to display information;
 a mode control unit configured to perform control at least so as to switch a first mode that causes an information processing apparatus to be operated at a first voltage level and a second mode that is a state where the display unit does not display information and that causes the information processing apparatus to be operated at a second voltage level higher than the first voltage level; and
 an operation control unit configured to, if a state satisfies a certain condition after the mode control unit switches a mode to the second mode, disable certain input operation performed by a user, the certain input operation switching the state to a state where the display unit displays information.
(14) A power control method including:
 performing control at least so as to switch a first mode that causes an information processing apparatus to be operated at a first voltage level and a second mode that causes the information processing apparatus to be operated at a second voltage level higher than the first voltage level; and
 disabling certain input operation performed by a user if a state satisfies a certain condition after a mode is switched to the second mode.

What is claimed is:
1. An information processing apparatus comprising:
 a mode control unit configured to perform control at least so as to switch periodically between a first mode that causes the information processing apparatus to be operated at a first voltage level and a second mode that causes the information processing apparatus to be operated at a second voltage level higher than the first voltage level and lower than a third voltage level of a third mode corresponding to a running state of the information processing apparatus; and
 an operation control unit configured to disable certain input operation performed by a user if a state satisfies a certain condition after the mode control unit switches from the first mode to the second mode,
 wherein the certain input operation is a switching from the second mode to the third mode, and
 wherein the mode control unit and the operation control unit are each implemented via at least one processor.
2. The information processing apparatus according to claim 1,
 wherein, in a case where the mode control unit switches from the first mode to the second mode in a certain periodic cycle, the operation control unit disables certain input operation performed by the user on a condition that the information processing apparatus is operating in the second mode, as the certain condition.
3. The information processing apparatus according to claim 2,
 wherein the first mode corresponds to a sleeping state.
4. The information processing apparatus according to claim 1,
 wherein the operation control unit disables certain input operation performed by the user on a condition that the information processing apparatus is operating in a state where a display is off, as the certain condition.
5. The information processing apparatus according to claim 4,
 wherein, in the case where the information processing apparatus is operating in the state where the display is off, the operation control unit disables the certain input operation if the information processing apparatus is not in a certain state.

6. The information processing apparatus according to claim 1,
wherein the operation control unit performs control in a manner that an input operation not to be disabled exists even if the state of the information processing apparatus satisfies the certain condition.

7. The information processing apparatus according to claim 6,
wherein the input operation not to be disabled is input operation to a power button.

8. The information processing apparatus according to claim 1,
wherein the mode control unit causes communication processing with external equipment to be executed when causing the information processing apparatus to be operated in the second mode.

9. The information processing apparatus according to claim 1,
wherein the operation control unit stops power supply to a device on which input operation is performed when certain input operation performed by the user is disabled.

10. The information processing apparatus according to claim 1,
wherein the operation control unit disables input from a device on which input operation is performed when certain input operation performed by the user is disabled.

11. The information processing apparatus according to claim 1,
wherein the operation control unit determines an exposure state of a display and then determines whether the certain condition is satisfied.

12. The information processing apparatus according to claim 11,
wherein, in a state where the display is exposed, the operation control unit determines whether the certain condition is satisfied.

13. An information processing system comprising:
a display unit configured to display information;
a mode control unit configured to perform control at least so as to switch periodically between a first mode that causes an information processing apparatus to be operated at a first voltage level and a second mode that is a state where the display unit does not display information and that causes the information processing apparatus to be operated at a second voltage level higher than the first voltage level and lower than a third voltage level of a third mode corresponding to a running state of the information processing apparatus; and
an operation control unit configured to, if a state satisfies a certain condition after the mode control unit switches from the first mode to the second mode, disable certain input operation performed by a user, the certain input operation switching from the second mode to the third mode where the display unit displays information,
wherein the display unit, the mode control unit, and the operation control unit are each implemented via at least one processor.

14. A power control method, implemented via at least one processor, the method comprising:
performing control at least so as to switch periodically between a first mode that causes an information processing apparatus to be operated at a first voltage level and a second mode that causes the information processing apparatus to be operated at a second voltage level higher than the first voltage level and lower than a third voltage level of a third mode corresponding to a running state of the information processing apparatus; and
disabling certain input operation performed by a user if a state satisfies a certain condition after the first mode is switched to the second mode,
wherein the certain input operation is a switching from the second mode to the third mode.

* * * * *